Patented Nov. 4, 1941

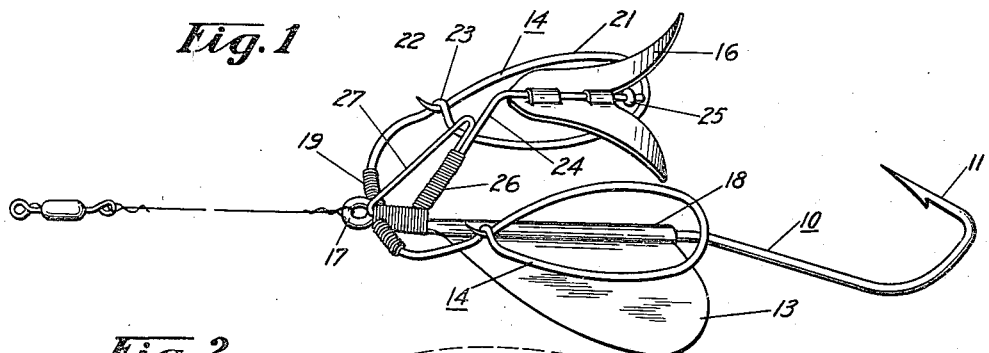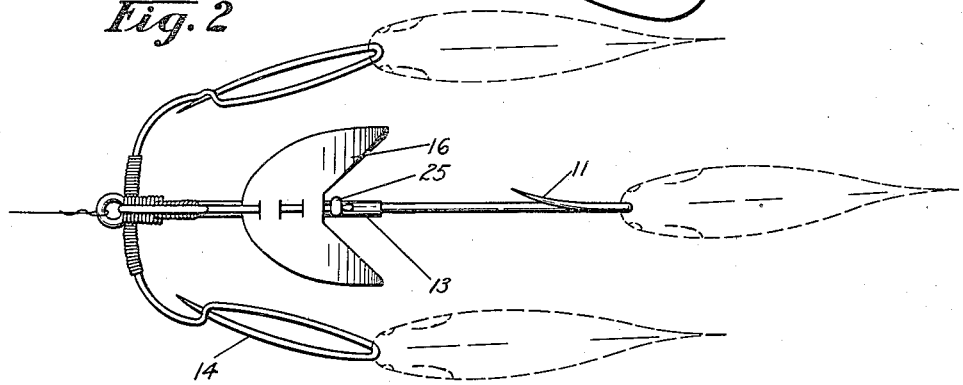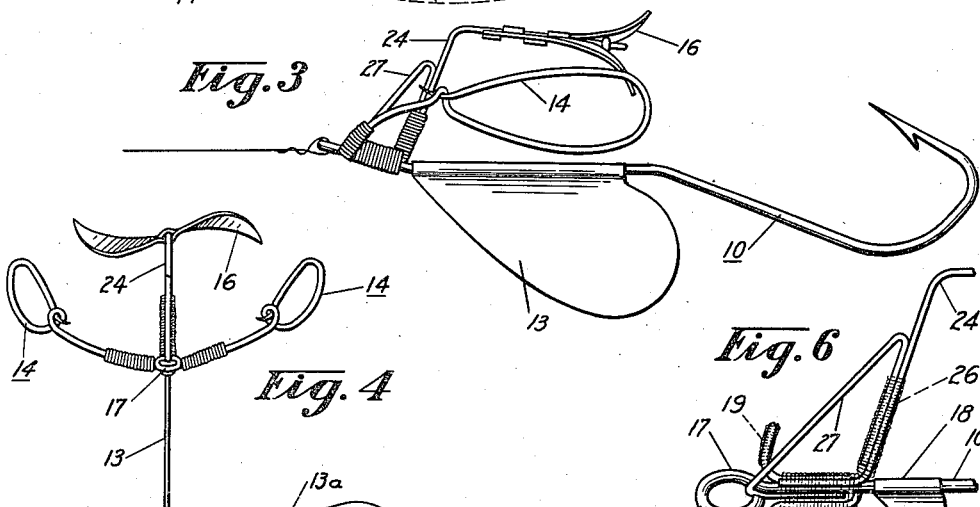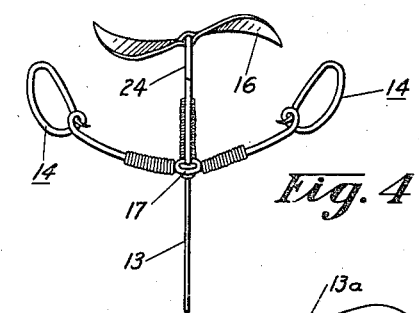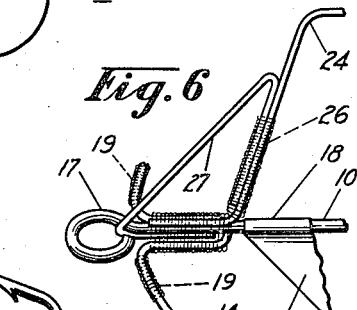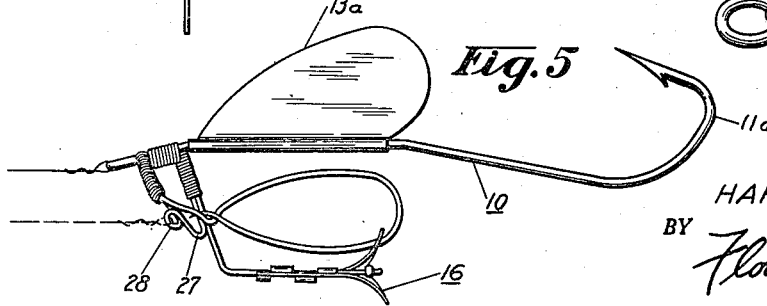
INVENTOR.
HARRY DEMORY
BY Flournoy Corey
ATTORNEY.

2,261,433

UNITED STATES PATENT OFFICE 2,261,433

FISH LURE OR TROLLING HOOK

Harry Demory, Cedar Rapids, Iowa

Application May 6, 1940, Serial No. 333,501

5 Claims. (Cl. 43—42)

This invention relates to fishing lures and has particular relation to a casting or trolling hook adapted to use live or artificial bait.

It is general knowledge, among fishermen, that fish are much more likely to strike at a lure or hook on which the bait is more or less widely distributed. For example, if a number of minnows are used for bait, a lure baited so as to separate the minnows will have the natural appearance of a small school of minnows, and thus is much more attractive to fish.

Statutes in many states make it illegal to use live or manufactured bait on spoons, plugs, trolling hooks or the like, having more than one hook. In fact, throw lines may have only one hook.

It is, therefore, among the objects of my invention to provide a fish lure, not only in itself attractive to fish, but adapted for the use of live or manufactured bait, and yet so constructed as to comply with state laws regulating the use of plural-baited hooks.

It is another object of my invention to provide a hook of this character which is substantially weedless.

A further object of my invention is to provide a novel means or method for stabilizing fishing lures.

A still further object of my invention is the provision of an improved bait holder.

Still another object of the invention is the provision of a simple device of the character described which may be manufactured at relatively low cost.

Other and further features and objects of the invention will be more apparent to those skilled in the art upon a consideration of the accompanying drawing and following specifications, wherein are disclosed several exemplary embodiments of the invention, with the understanding, however, that such changes may be made therein as fall within the scope of the appended claims, without departing from the spirit of the invention.

In said drawing:

Figure 1 is a side view in perspective of a fish lure constructed in accordance with one modification of my invention.

Figure 2 is a top view of the device shown in Figure 1 and illustrates how it appears when minnows are used as bait.

Figure 3 is a view in side elevation of the device shown in Figures 1 and 2.

Figure 4 is a view in end elevation of the device shown in Figures 1 to 3 inclusive.

Figure 5 is a side elevational view of a fish lure constructed in accordance with a slightly modified form of my invention, and Figure 6 is a fragmentary view in perspective illustrating, in better detail, the manner of joining and wrapping the wire members of the device.

Referring now to the drawing and, in particular, to Figures 1 to 4 thereof; the device shown comprises, in general, a central shank 10 having a single hook 11 at its rearmost end, a keel 13 extending downwardly from the shank, a pair of transversely extending bait holders 14—14, and a spinner or other attention attracting means 16 preferably positioned between the bait holders 14—14.

The shank 10 and hook 11 may comprise an ordinary relatively large fish hook having an eyelet 17 at its forward end, and the keel may be of thin sheet metal formed along one edge, as shown at 18, so as to encircle the shank and be affixed thereto.

The bait holders 14—14 may be formed of loops of spring brass or steel wire, as shown, and fastened to the shank near the eyelet by wrapping, as shown at 19, by soldering, welding or any other suitable means. These bait holders preferably extend laterally from the shank and rearwardly and terminate in loops 21 on which bait may be placed. These loops are preferably closed, as shown, or at least substantially closed to comply with statutory laws above mentioned and to overcome any objections to the bait holders on the ground that they are the equivalent of hooks.

The ends of the bait holders may be sharpened to facilitate baiting and slightly hooked as shown at 22. This hooked end of the bait holder is adapted to be engaged, somewhat in the manner of a safety pin, under a small loop 23 formed in the spring wire. It is obvious, however, that such a looped bait holder may be held closed by other than the preferred means shown.

The spinner 16 may be formed of thin sheet metal, preferably bright, and mounted for free rotation on a wire shaft 24 attached to the shank 10 near the eyelet and extending upwardly and rearwardly between the bait holders. This spinner may be substantially in the form of a fishtail as shown, but of course may be in any other form.

A glass bead 25 may be positioned on the rear end of this spinner shaft to permit free operation of the spinner. This bead may be a slightly flattened globe of glass or the like with a hole extending through the center.

It is preferable that the spinner shaft upright comprise a pair of wires wrapped, as shown at 26, and with one of the wires bent forwardly and joined to the eyelet to form a brace 27. This brace protects the wire spinner shaft from bending when logs or weeds are encountered.

In the modification of my invention, as shown in Figure 5, the position of the hook 11a is reversed so as to lie to the rear of the keel 13a rather than behind the spinner 16a.

It should be noted that the shank 10 of the hook, in both embodiments of my invention, is bent so as to extend downwardly at the rear. This lowers the center of gravity of the lure and the device shown in Figures 1 to 4 inclusive will move through the water with the spinner up.

The manner of securing together the spinner shaft, the bait holders and the shank of the hook is shown in detail in Figure 6.

The lure illustrated in Figure 5 will tend to pass through the water with the spinner below the keel.

The brace 27 may have an auxiliary eyelet formed therein as shown at 28 in Figure 5, and in such case, the lure may be caused to ride with its spinner up rather than down by attaching the leader to the second eyelet 28 rather than to the main eyelet.

The keel prevents undue whipping or spinning of the lure as a whole.

In using the device, it is preferable that a leader and swivel be employed, as shown in Figure 1.

Although I have described specific embodiments of my invention, it is apparent that modifications thereof may be made by those skilled in the art. Other forms of spinners than that shown may be used. It will be obvious, also, that more bait holders than shown may be employed. These and other modifications may be made without departing from the spirit and scope of my invention as set forth in the appended claims.

I claim as my invention:

1. In a fishing lure, a single hook, a spinner supported for free rotation at a spaced distance from the hook and ahead of it, at least two bait holders comprising substantially closed loops also supported in spaced relation to the hook and to the spinner, and a keel for stabilizing the lure.

2. In a fish lure, a shank having a hook on its rear end and a keel on the main portion of the shank, a pair of bait holders secured to the shank near the front end thereof and extending outwardly, rearwardly and upwardly away from the keel, a spinner shaft also secured to the shank and projecting at substantially right angles to the bait holders where they join the shank, and a spinner on the spinner shaft, the length of the spinner shaft being such that the spinner is positioned substantially between the free ends of the bait holders.

3. In a fish lure, a shank ending in a hook, a pair of bait holders secured to the shaft and extending outwardly on opposite sides thereof, a keel on the shank, a spinner shaft secured to the shank, and a spinner, the keel, spinner, shank and hook being located substantially in one plane with the keel on one side of the shank and the spinner on the other, and the bait holders being located approximately in a plane at right angles to the first named plane, whereby the bait of minnows and the like may be placed on the bait holders and the hook to approximate the appearance of a school of minnows and the like and whereby the spinner will attract the attention of the fish and the keel will hold the lure in upright position.

4. In a fish lure, a hook having a shank, a keel secured on the shank of the hook, a spinner shaft, a spinner on said shaft, means securing said spinner shaft and spinner on the shank in spaced relation to the keel and on the opposite side of the shank from the keel, and a pair of bait holders secured to the shank with the bait holding portion of the holders in planes outside of the plane of the keel and spinner and on the opposite sides of such a plane.

5. In a fish lure, the combination of a hook, a plurality of substantially closed bait holders having the shanks thereof secured to the shank of the hook and with the bait holders spaced from the hook, a spinner shaft secured to the shank of the hook, a spinner on the shaft spaced from the hook for free rotation substantially between two of the bait holders, and a keel secured on the shank of the hook ahead of and substantially in line with the hook.

HARRY DEMORY.